United States Patent Office 3,111,507
Patented Nov. 19, 1963

3,111,507
POLYMERIZATION OF ACRYLATES, METHACRYLATES AND ACRYLONITRILES AND CATALYSTS FOR SAME
William R. Watt, Newark, Del., assignor, by mesne assignments, to FMC Corporation, San Jose, Calif., a corporation of California
No Drawing. Filed Jan. 30, 1959, Ser. No. 790,076
10 Claims. (Cl. 260—88.7)

This invention relates to novel polymerization processes and to novel catalysts for use in those processes. More particularly this invention relates to novel processes of polymerizing acrylates, methacrylates and acrylonitriles and to a novel catalyst system comprising a group Ia of the periodic table metal amide and an organic metal oxide.

The invention has for an object to provide a novel process for polymerizing acrylates, methacrylates and acrylonitriles to form normally solid polymers thereof.

Another object of the invention is to provide a catalyst system comprising an amide of a metal of group Ia of the periodic table and an alkoxide of a metal of groups IIIb and IVa of the periodic table.

Other objects and advantages of the invention will be apparent from the following description and illustrative examples.

In accordance with the present invention, an acrylate, methacrylate or acrylonitrile having the general formula

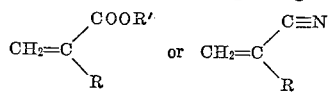

where R is hydrogen or a methyl radical and R' is an alkyl, cycloalkyl, aryl, alkaryl, arylalkyl, or N,N-dialkyl amino alky group, is polymerized at relatively low temperature to form a normally solid high molecular weight polymer having more than 100 monomer units. The following are examples of R': methyl, ethyl, propyl, iso-propyl, n-butyl, sec-butyl, iso-butyl, octyl, decyl, dodecyl, stearyl, cyclohexyl, phenyl, tolyl, phenyl ethyl, and N,N dimethyl amino ethyl.

The polymer may be a homo polymer of any one of these monomers or may be an inter-polymer of any two or more of them.

The catalyst system of this invention is the reaction product of an amide of a metal of group Ia of the periodic table including lithium, sodium, potassium, rubidium and caesium and an organic metal oxide compound having the general formula $M(OR^4)_n$ wherein M is a metal of groups IIIb and IVa of the periodic table including boron, aluminum, titanium and zirconium. $R^4$ is an alkyl, aryl, cycloalkyl, alkaryl or aryl alkyl group including ethyl, propyl, n-butyl, sec-butyl, iso-butyl, amyl, 2-ethyl hexyl, dodecyl, stearyl, cyclohexyl, phenyl, tolyl and phenyl ethyl.

In preparing the catalyst in accordance with the invention the amide and organic metal oxide components are mixed together in a solvent such as toluene wherein the components react together. The proportions of the amide and oxide may be varied over relatively wide limits. A ratio of proportions that have been found satisfactory are from 2 to 7 mols of the amide to one mol of the oxide.

In carrying out the polymerization, small amounts of the amide and the oxide components are added to a non-reactive solvent such as toluene and allowed to react with each other. The monomer or mixture of the monomers to be polymerized are slowly added with stirring and the polymer is formed. The reaction may be carried out at room temperature or at a lower temperature.

The following examples are illustrative of the invention:

Example 1

Two grams of sodamide and 1.9 grams of tetraisopropyl orthotitanate were mixed in 150 ml. of toluene and refluxed 30 minutes. The mixture was cooled to minus 40° C. and 10 ml. of methyl methacrylate was added dropwise with stirring. Within a few minutes the polymerization mixture became so viscous that it could not be stirred. The polymerization was quenched by adding 25 ml. of alcohol. Polymer was precipitated by stirring the polymerization mixture in isopropanol. Conversion of monomer to polymer was practically quantitative.

Example 2

Two grams of sodamide and 2 grams of tetraisopropyl orthotitanate were mixed in 200 ml. of toluene and refluxed one hour. The mixture was cooled to minus 75° C. and 25 ml. of methyl methacrylate was added at a rate of about one ml. per minute. The polymerization mixture was stirred at minus 75° C. for 90 minutes, during which time the viscosity increased appreciably. Polymerization was stopped by adding 25 ml. of isopropanol. The mixture was diluted with toluene and poured into isopropanol. The precipitated polymer was filtered off, washed several times with alcohol, and dried under vacuum at 50° C. Yield of polymer was 82% based on weight of monomer.

Example 3

Two grams of sodamide and 2 grams of tetraisopropyl orthotitanate were added to 200 ml. n-hexane and refluxed 90 minutes. The mixture was then cooled to 3–4° C. on an ice bath and a solution of 25 ml. of ethyl methacrylate in 25 ml. hexane was added; following which the mixture was stirred on ice for three hours. The reaction was quenched by adding alcohol and the mixture evaporated to dryness. The polymeric residue was taken up in hot methyl ethyl ketone and precipitated by stirring into isopropanol. Polymer was filtered off, washed with alcohol and dried under vacuum at 50° C.

Example 4

Two grams of tetraisopropyl orthotitanate and two grams of sodamide were mixed in 200 ml. toluene, refluxed 30 minutes, then cooled to 0° C. A solution of 25 ml. of isobutyl methacrylate in 25 ml. of toluene was added with stirring on ice. After 45 minutes, during which the mixture became viscous, the reaction was quenched by adding 50 ml. of methanol. The polymerization mixture was diluted with 100 ml. toluene, and polymer was precipitated by pouring into 1500 ml. of methanol. The polymer was washed three times with hot methanol and once with water. Percent conversion of monomer to polymer was 80.4%.

Example 5

A mixture of 2 grams of sodamide and 2 grams of tetraisopropyl orthotitanate in 200 ml. toluene was refluxed 20 minutes, then cooled to 3–4° C. on ice. A solution of 25 ml. of secondary butyl methacrylate in 25 ml. toluene was added. The mixture was stirred on ice for 30 minutes, during which viscosity increased markedly. At the end of 30 minutes, the reaction was quenched by adding 35 ml. of methanol, diluted with 200 ml. toluene and poured into 1500 ml. methanol. The precipitated polymer was washed with alcohol and water and dried under vacuum at 65° C. The dry product weighed 30 grams.

Example 6

A mixture of 2.3 grams of lithium amide and 2 grams of tetraisopropyl orthotitanate in 100 ml. of toluene was refluxed 30 minutes then cooled to 0° C. Twenty-five ml. of methyl methacrylate was added, and the mixture was stirred one hour at 0° C. The mixture was then warmed to 25° and stirred one hour at 25° C. The mixture was poured into 1500 ml. of methanol. Precipitated polymer was filtered off, washed several times with methanol and water and air dried 16 hours. The polymeric product weighed 6.8 grams (28.9% conversion).

*Example 7*

A mixture of 0.5 gram of sodamide and 3 grams of tetraisopropyl orthotitanate in 20 ml. of diethyl ether was stirred 90 minutes at room temperature, then diluted with 130 ml. of ether and cooled to minus 45° C. The solution of 25 ml. of methyl methacrylate in 25 ml. ether was added dropwise. The mixture was stirred at minus 45° for one hour, then poured into methanol. The precipitated polymer was filtered off, washed and dried. The product weighed 16.5 grams (70.3% conversion) and had a molecular weight of 119,500.

*Example 8*

A mixture of 2 grams of sodamide, 2 grams of tetraisopropyl orthotitanate and 50 ml. of toluene was refluxed 30 minutes, diluted with 150 ml. toluene and cooled to minus 40° C. Twenty-five ml. of methyl acrylate was added and continuously stirred at minus 40° for one hour. Quenched reaction with 50 ml. methanol. The polymer was precipitated in alcohol, filtered off, washed and dried at 60° C. under vacuum. The product weighed 10.3 grams.

*Example 9*

A mixture of 2.75 grams of sodamide and 10 grams of tetraisopropyl orthotitanate in 70 ml. of toluene was warmed to 90° C. and filtered hot. Twenty-five ml. of the filtrate was added to 200 ml. of toluene and cooled to minus 70° C. Twenty-five ml. of acrylonitrile was added dropwise with stirring, followed by 15 ml. more of the catalyst solution. The reaction mixture was stirred one hour at minus 70° C., then quenched. The polymer was precipitated in alcohol, washed, and dried 8 hours under vacuum at 60° C. The dry polymeric product weighed 21.1 grams.

*Example 10*

A mixture of 2.8 grams of sodamide and 9.7 grams of tetraisopropyl orthotitanate in 50 ml. of petroleum ether was stirred 3 hours at 40° C. The mixture was then filtered. Twenty-five ml. of the filtered catalyst solution was diluted with 100 ml. of petroleum ether and cooled to minus 60° C. Twenty-five ml. of methyl methacrylate was added. The mixture was stirred 30 minutes at minus 60° C., then warmed to minus 40° C. Twenty-five ml. more of methyl methacrylate was added and the mixture allowed to warm to 0° C., whereupon 200 ml. of hexane was added and the reaction quenched with 25 ml. of methanol. The polymer was filtered off, washed and dried. Weight of product=33.2 grams.

*Example 11*

A mixture of 2 grams of sodamide and 5 grams of tetrastearyl orthotitanate in 75 ml. of toluene was refluxed 24 hours and filtered hot. Twenty-five ml. of the filtrate was diluted with 100 ml. of toluene and 25 ml. of methyl methacrylate was added. After thorough mixing, the reaction mixture was allowed to stand 24 hours at 25° C. The polymer was precipitated in isopropanol, washed and dried. The product weighed 17.8 grams.

*Example 12*

One-half gram of sodamide and 2.5 grams of aluminum isopropylate in 40 ml. of hexane were refluxed 30 minutes, then cooled to room temperature. To the mixture was added 25 ml. of methyl methacrylate. The mixture was stirred five hours at room temperature, during which time polymer formed. Reaction was quenched by adding 100 ml. of methanol. The polymer was precipitated in methanol, filtered off, and purified by dissolving in hot methyl ethyl ketone and reprecipitating in methanol. The dried polymer weighed 5.91 grams (25.2% conversion).

*Example 13*

One-half gram of sodamide and 2 ml. of triethyl borate were mixed in 40 ml. of hexane and refluxed 30 minutes. The mixture was cooled to room temperature and 25 ml. of methyl methacrylate was added. The mixture was stirred four hours at room temperature, during which white solid collected around the edge of the reaction mixture. Reaction was quenched with 100 ml. of methanol. Tacky solid polymer was separated, dissolved in chloroform, and reprecipitated in alcohol.

*Example 14*

Three grams of sodamide was suspended in 50 ml. of toluene and 10 ml. of tetra-amyl orthotitanate was added. The mixture was stirred one hour at 90° C. and filtered hot. Twenty-five ml. of the filtrate was transferred to a flask containing 150 ml. of toluene and cooled to minus 20° C. Twenty-five ml. of methyl methacrylate was added dropwise with stirring, maintaining temperature of the reaction mixture at minus 20° C. Before all the monomer had been added, the mixture was extremely viscous. Temperature was maintained at minus 20° C. for 30 minutes after all the monomer had been added, then let stand one hour at room temperature. The polymer was precipitated in alcohol, washed and dried. The dried polymer weighed 22.7 grams.

*Example 15*

A mixture of three grams of sodamide and ten grams of tetracyclohexyl orthotitanate in 50 ml. of toluene was refluxed two hours, then filtered hot. Ten ml. of the filtrate was added to 100 ml. of toluene and cooled to 3–4° C. Twenty-five ml. of methyl methacrylate was added dropwise with stirring and the reaction mixture stirred on ice for one hour. The reaction was quenched with alcohol and the polymer filtered off, washed and dried. Dried product weighed 18.5 grams.

We claim:

1. A catalyst complex formed by reacting a ratio of 2–7 mols of an inorganic alkali metal amide with 1 mol of an organic metal oxide having the general formula $M(OR)_n$ wherein M is a metal selected from the group consisting of boron, aluminum, titanium, and zirconium and R is a member of the group consisting of alkyl, aryl, cycloalkyl, alkaryl and arylalkyl and $n$ is the valence of the metal.

2. The catalyst of claim 1 wherein the metal oxide is tetraisopropyl orthotitanate.

3. The catalyst of claim 1 wherein the metal oxide is tetra-amyl orthotitanate.

4. The catalyst of claim 1 wherein the metal oxide is tetracyclohexyl orthotitanate.

5. The catalyst of claim 1 wherein the metal oxide is tetra-n-butyl orthotitanate.

6. A method of producing a high molecular weight polymer by polymerizing at least one compound having the general formula

wherein R' is a member of the group consisting of hydrogen and methyl, R" is a member of the group consisting of —CN, and

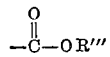

where R''' is a member of the group consisting of alkyl, cycloalkyl, aryl, arylalkyl, alkaryl, and N,N dialkyl amino alkyl, in the presence of a catalyst complex consisting essentially of a product formed by reacting a ratio of 2–7 mols of an inorganic amide of a metal selected from the group consisting of lithium, sodium, potassium, and 1 mol of an organic metal oxide having the general formula $M(OR)_n$ where M is a metal selected from the group consisting of boron, aluminum, titanium, and zirconium and R is a member of the group consisting of alkyl, aryl, cycloalkyl, alkaryl and aralkyl and $n$ is the valence of the metal.

7. The method of claim 6 wherein the metal oxide is tetraisopropyl orthotitanate.

8. The method of claim 6 wherein the metal oxide is tetra-amyl orthotitanate.

9. The method of claim 6 wherein the metal oxide is tetracyclohexyl orthotitanate.

10. The method of claim 6 wherein the metal oxide is tetra-n-butyl orthotitanate.

References Cited in the file of this patent

UNITED STATES PATENTS

| | | |
|---|---|---|
| 2,608,554 | Bullitt | Aug. 26, 1952 |
| 2,721,189 | Anderson et al. | Oct. 18, 1955 |
| 2,840,551 | Field et al. | June 24, 1958 |
| 2,899,418 | Reynolds | Aug. 11, 1959 |
| 2,930,785 | Edmonds | Mar. 29, 1960 |

OTHER REFERENCES

Gaylord et al.: "Linear and Stereoregular Addition Polymers," Interscience Publishers Inc., N.Y., 1959.